Jan. 30, 1945. L. M. LLORENS 2,368,311
COMPUTING AND LISTING MACHINE
Original Filed Aug. 14, 1937 7 Sheets-Sheet 1

INVENTOR
LOUIS M. LLORENS
BY Emery, Varney, Whittemore & Dix
ATTORNEYS

Jan. 30, 1945. L. M. LLORENS 2,368,311
COMPUTING AND LISTING MACHINE
Original Filed Aug. 14, 1937 7 Sheets-Sheet 2

INVENTOR
LOUIS M. LLORENS
BY Emery, Varney, Whittemore & Dix
ATTORNEYS

INVENTOR
LOUIS M. LLORENS

Jan. 30, 1945. L. M. LLORENS 2,368,311
COMPUTING AND LISTING MACHINE
Original Filed Aug. 14, 1937 7 Sheets-Sheet 4

INVENTOR
LOUIS M. LLORENS
BY Emery, Varney,
Whittemore, + Dix
ATTORNEYS

Jan. 30, 1945.   L. M. LLORENS   2,368,311
COMPUTING AND LISTING MACHINE
Original Filed Aug. 14, 1937   7 Sheets-Sheet 5

INVENTOR
LOUIS M. LLORENS
BY Emery, Varney,
Whittemore & Dix
ATTORNEYS

Jan. 30, 1945.   L. M. LLORENS   2,368,311
COMPUTING AND LISTING MACHINE
Original Filed Aug. 14, 1937   7 Sheets-Sheet 6

INVENTOR
LOUIS M. LLORENS
BY
ATTORNEYS

Jan. 30, 1945. L. M. LLORENS 2,368,311
COMPUTING AND LISTING MACHINE
Original Filed Aug. 14, 1937   7 Sheets—Sheet 7
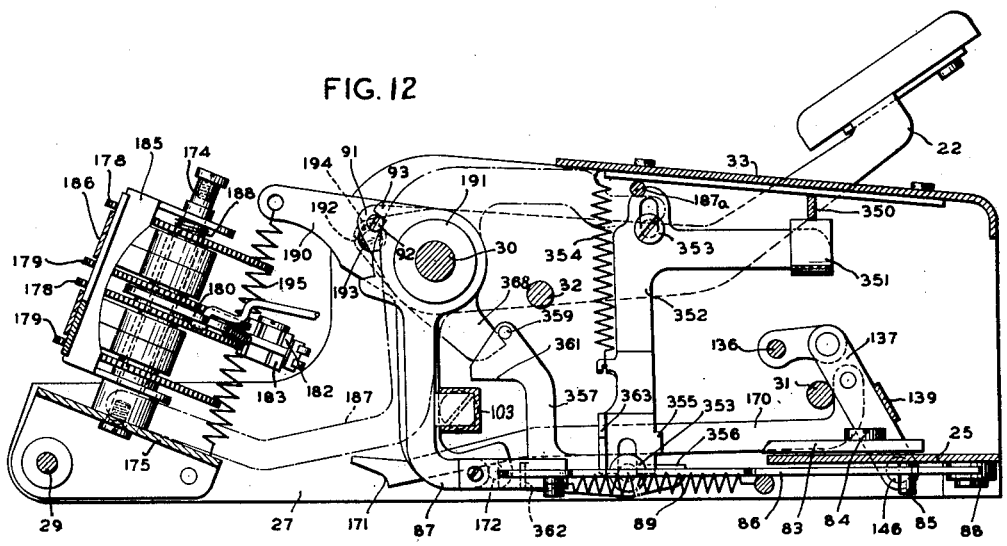
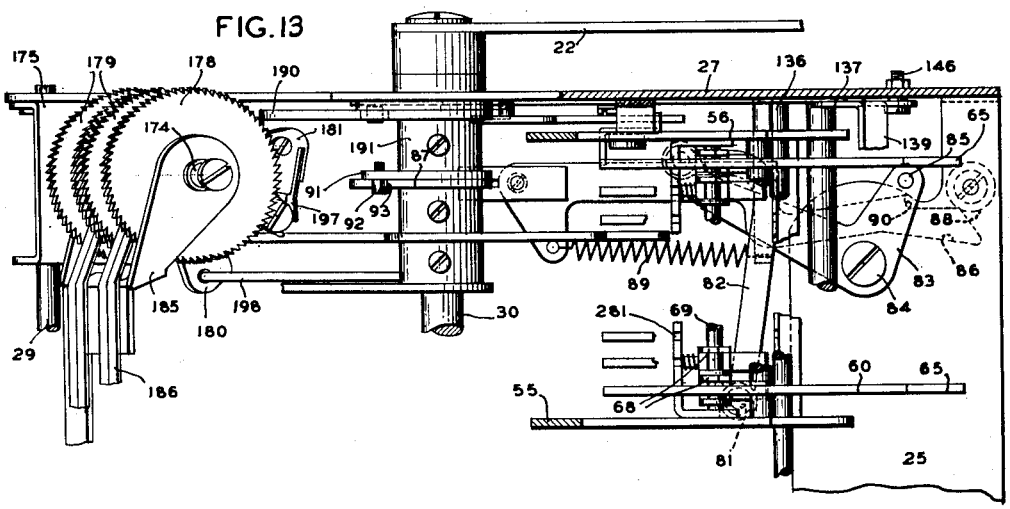
INVENTOR
LOUIS M. LLORENS
BY
ATTORNEYS Patented Jan. 30, 1945

2,368,311

UNITED STATES PATENT OFFICE 2,368,311

COMPUTING AND LISTING MACHINE

Louis M. Llorens, Great Barrington, Mass., assignor, by mesne assignments, to Swift Business Machines Corporation, Great Barrington, Mass., a corporation of Delaware Original application August 14, 1937, Serial No. 159,169. Divided and this application February 5, 1942, Serial No. 429,587

9 Claims. (Cl. 235—60)

This invention pertains to computing machines, and its main object is to provide an improved computing and listing machine.

This application is a continuation of my application Ser. No. 159,169 filed August 14, 1937.

Some of the features of this improved machine are: a smaller size machine with less height thereby making it more comfortable to operate; an operating lever or handle with a much shorter stroke than in the machines now available; substantially immediate locking of the stop carriage in its various adjusted positions when the operating handle has been moved from its initial position; and the manner of setting the stop slides in a travelling carriage under control of the digit keys.

Further features and advantages will become apparent from the following description and claims when taken in connection with the accompanying drawings in which:

Fig. 12 is a detail cross-section looking toward the right-hand side of the machine, showing the ribbon control mechanism, stop bar, restoring bail and travelling carriage restoring mechanism; and Fig. 13 is a plan view of Fig. 12.

Figure 1:
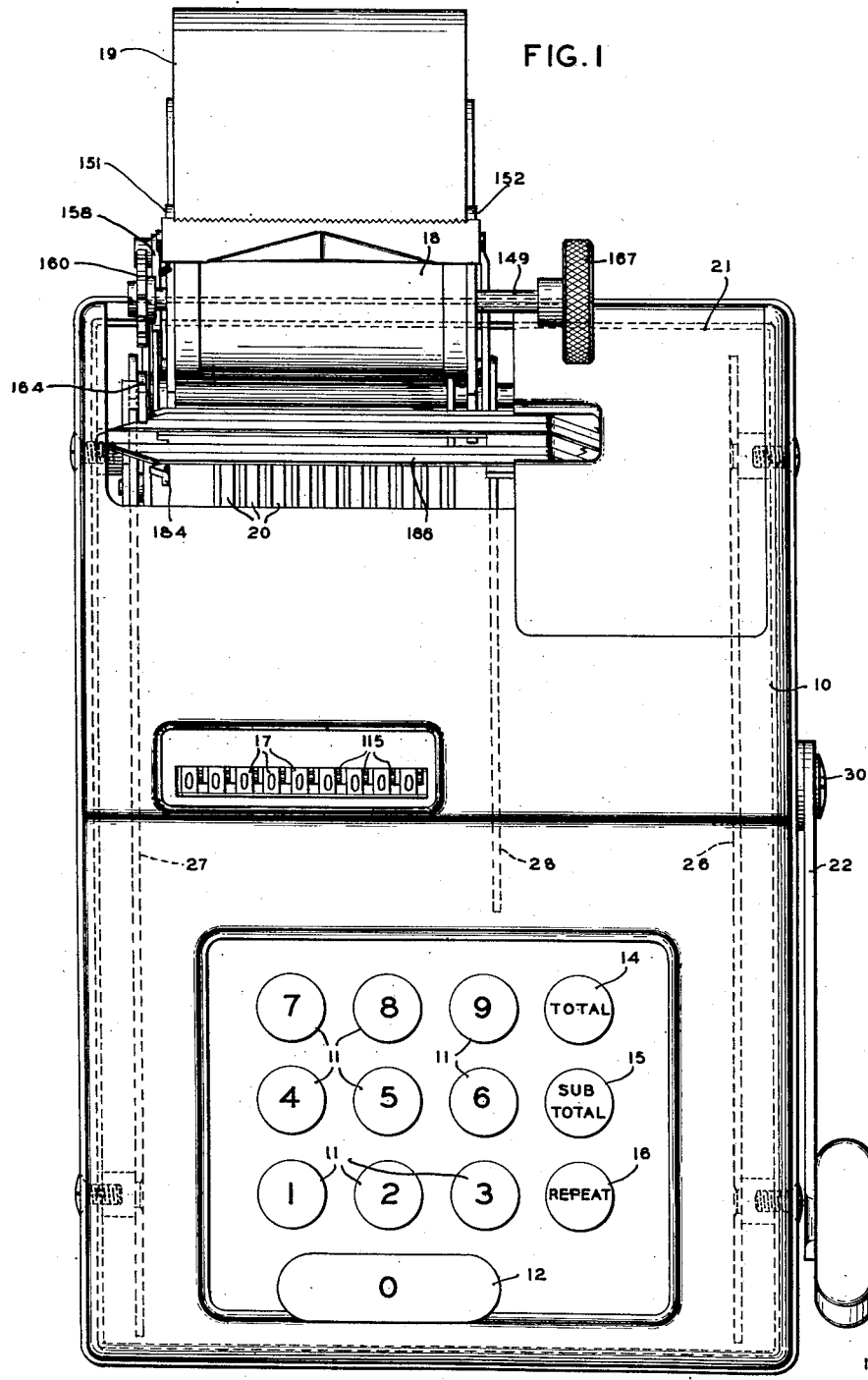
Fig. 1 is a plan view of the machine with the covers in place, disclosing the keyboard, operating lever, accumulator indicators, and printing platen.

Referring to the drawings, the casing 10 (Fig. 1) is provided with an aperture through which dial or numeral wheels 17 may be read. At the rear of the machine is located a platen 18, paper roll 19, and type sectors 20 for printing the items and totals. Located in casing 21, shown at the right rear corner of the machine, are the ribbon spools and their associated mechanism.

Figure 3:
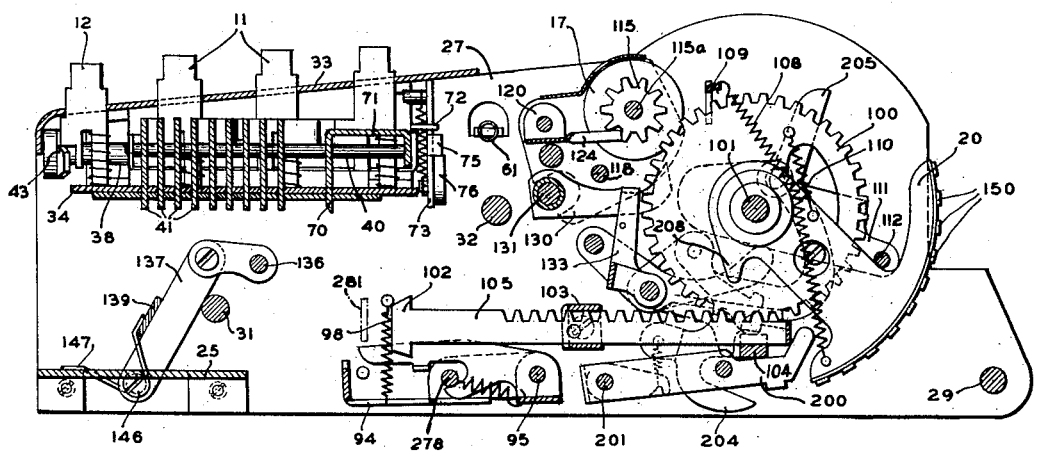
Fig. 3 is a cross-section, through 3—3 of Fig. 2, disclosing the accumulator section and keyboard operating mechanism.

Extending through the right-hand side of casing 10 is the main drive shaft 30, to the end of which is secured a short-stroke operating lever 22 normally in substantially horizontal position. The mechanism is contained between a pair of side frames 26 and 27 (Fig. 2) which are secured together at the base by a plate 25 spaced above the lower edges of the side frames 26 and 27, and at other points by tie rods 29, 31 and 32. Located between the side frames 26 and 27 is a mid-frame 28 (Fig. 2) which is secured to comb 103 and rod 104 (Fig. 3). The frames form bearings for various shafts of the mechanism.

Keyboard

Figure 2:
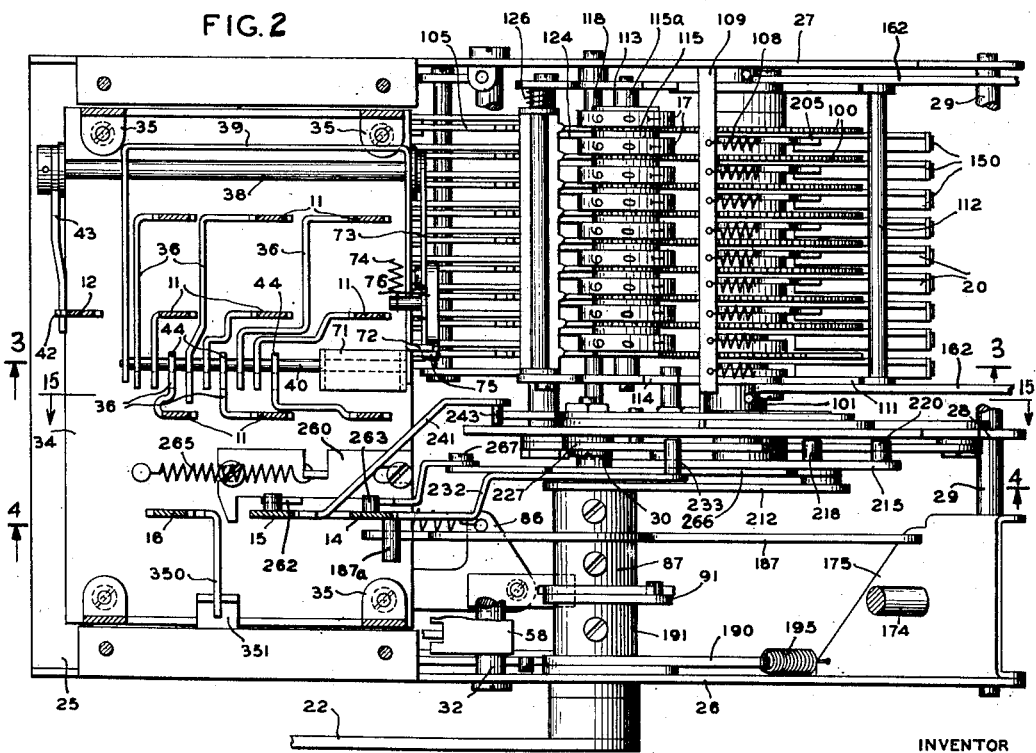
Fig. 2 is a plan view of the machine with the covers and keyboard removed.
Figure 6:
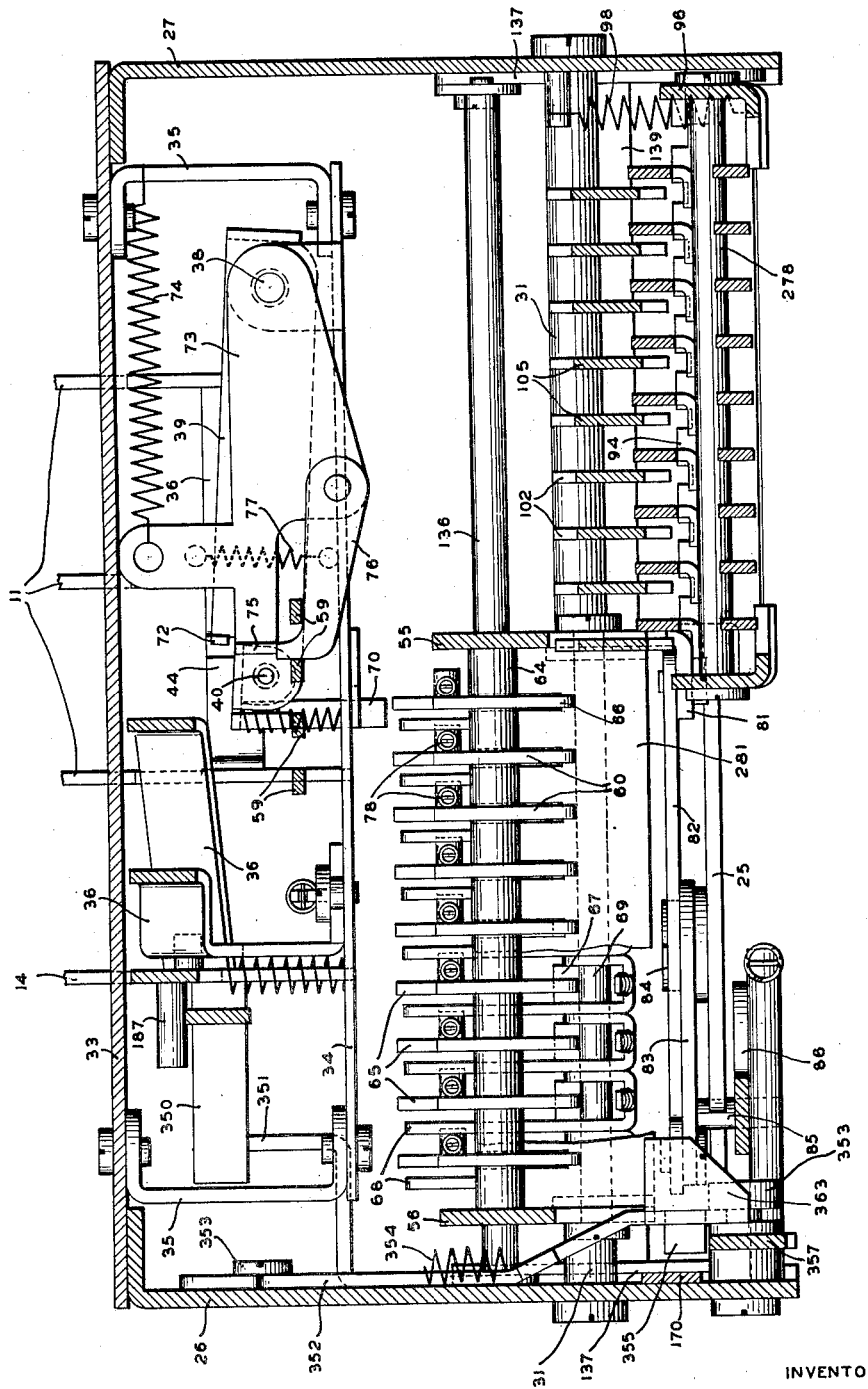
Fig. 6 is a cross-section, taken on the line 6—6 of Fig. 4 showing the travelling stop carriage and its associated restoring and escapement mechanisms.

The keyboard of the machine comprises nine digit keys 11, a "zero" key 12, and three operational or control keys, i. e., "total" key 14, "subtotal" key 15, and "repeat" key 16. The key shanks are formed of thin strip metal, as shown in Figs. 2, 3, 4 and 6 and are positioned in slots formed in the plates 33 and 34. The plate 33 extends farther to the rear than plate 34, as shown in Figs. 2 and 6, and also extends from one side to the other, and has a curved front portion which follows the contours of the top edges of the side frames. The plates 33 and 34 are secured together in spaced relation by two U-shaped brackets 35 (Fig. 6), to form a structure which may be removed from the machine as a unit.

The digit keys 11 are formed as shown in Figs. 2 and 6, each having a vertical shank extending through the plate 33 and a foot portion extending into the lower plate 34. Also formed integral with the shank of each of the digit keys is an arm 36, which is bent to extend toward the center of the key unit to overlie a bail 40 carried by a pair of arms of a frame 39 fixed on shaft 38 as shown in Figs. 2 and 6. The arms 36 of the "1, 3, 4, 5, 7, and 8" keys are bent to extend to the right (down, in Fig. 2)

and depending portions or key stops 41 formed on the ends thereof. These arms 36 contact bail 40 at a point between the shank and the portion 41. The arms 36 of the keys "3, 6 and 9," however, extend toward the left (up, in Fig. 2) and have fingers 44, extending beyond the portion 41 to contact the bail 40.

The "zero" key has a straight shank similar to the other digit keys, with the exception that in place of the arm 36, the key is provided with a shoulder 42 (Figs. 2 and 4) adapted to co-operate with a lever 43 secured to the shaft 38, and swing the bail 40 downwardly.

Travelling carriage with denominational slides settable by the digit keys

Said bail 40 serves to control the operation of nine denominational or selecting slides 60 and of the escapement mechanism of a travelling stop carriage located beneath the keyboard and formed of two side frames or plates 55 and 56 (Figs. 4, 5 and 6) secured together at the front by a square bar 57 having slots therein to form a comb, and at the rear by a comb 58 having square teeth 59. The carriage is slidably mounted on said tie rods 31 and 32, free movement of the carriage on the rod 32 being assured by providing the carriage with a roller 63 resting on this rod. The carriage is drawn to the left by a spring 61 connecting a lug on the frame 27 to a pin in the comb bar 58. Carried between the side frames 55 and 56 are rods 64 (Figs. 4 and 5) on which are slidably mounted the nine selecting slides 60, each (Fig. 4) having a slot receiving the rods 64 and being provided with a stop lug or shoulder 65 at the upper edge of the front end thereof, and a downwardly extending shoulder 66 at the lower edge of the rear end thereof.

Upon depression of a digit key 11 (Figs. 2 and 4) the corresponding key stop 41 is positioned in the path of shoulder 65 on the selecting slide 60 which is positioned below the stops 41 at this time, and the arm 36 or the finger 44, of the operated key, engages the bail 40, thereby depressing a finger 70 of a U-shaped member 71 (Figs. 2 and 3) into contact with a cam surface on the upper end of a long upwardly-extending arm of the latch member 68, and rocking this in a counter-clockwise direction (Fig. 4) to remove a pawl 67 from the path of ratchet teeth in the lower edge of the slide 60. The slide 60 thus freed moves rearwardly under the pull of a spring 78 until the shoulder 65 contacts the depressed stop 41.

The stops 41 are so located that, when the shoulder 65 of a slide 60 is in contact with one of them, the associated pawl 67 rests on a flat surface between ratchet teeth until the stop 41 rises, due to the release of the depressed key. At that time the bar or slide 60 continues its rearward movement and pawl 67 contacts the next adjacent ratchet tooth, thereby assuring the correct setting and positive engagement of the pawl and ratchet teeth thus locking the bar 60 against rearward movement.

By providing the carriage with denominational slides 60, the number of parts is much reduced, in that eighty-one pin stops are ordinarily required whereas in the instant machine only the nine slides 60 are required.

Carriage feed and return mechanism

On the rear arm of the bail 40 is a lug 72 which extends rearwardly and overlies an arm 73 (Figs. 3 and 6) rigidly mounted on the shaft 38 and urged in a clockwise direction by a spring 74. The arm 73 has at its free end a lug 75 which overlies the tip of a spring-pressed dog 76 pivoted on arm 73, and this tip cooperates with the teeth 59 (Fig. 5) of comb 58 of the carriage. The lug 75 and the tip of the dog 76, and the teeth 59, are included in latching and escapement means for the travelling carriage.

The slide carriage makes one step to the left for each depression of a key. Thus, if the numeral 235 is to be set on the machine, operation of the "2" key will cause the first selector or denominational slide 60 at the left to be set rearwardly two spaces and the travelling carriage to be stepped to the left one step; and operation of the "3" key will cause the next selector slide to the right to be positioned three spaces rearwardly from normal and the stop carriage to be stepped to the left one space; and operation of the "5" key will cause the selector slide to be positioned five spaces rearwardly from normal and the carriage to be moved to the next position to the left, where it comes to rest. In view of the fact that the machine disclosed contains nine stop slides 60, numbers containing nine orders of digits may be set up in the carriage and later entered in the machine.

Referring to Fig. 6 it will be seen that during the downward travel of the bail 40, the lug 72 contacts the upper edge of arm 73, thereby depressing the tip of dog 76 below the edge of the associated tooth 59 and permitting the escapement or comb bar 58 and its associated carriage to move into contact with the lug 75 which has been pushed down toward the teeth where it is held until the depressed key is released. At that time the arm 73 is raised by spring 74, removing the lug 75 from the path of the obstructing tooth 59 and the tooth then rides over the tip of the dog 76 and under the lug 75. When the edge of this tooth 59 is reached the dog 76 rises under the pull of a spring 77 which connects the arm 73 and the dog 76, thereby bringing the tip of the dog 76 into the path of the next tooth 59 to the right, the carriage thus being stepped one space to the left.

In its travel from right to left, the carriage acts to effect a setting of the carriage return mechanism so that the return mechanism will be rendered effective by depression of the operating member 22 and return thereof to normal position. Pivoted at 81 to the frame plate 55 (Figs. 6 and 13) of the travelling carriage is an L-shaped link 82 which at its other end is pivotally connected to an arm of a horizontally arranged bell-crank 83 pivoted at 84 to the substantially horizontal transverse plate 25 of the main frame. At its right-hand end the plate 25 is cut away to permit a pin 85 in the other arm of the bell-crank to extend downwardly into the path of a part of a horizontally movable bar 86 (Fig. 13) pivotally connected at its rear end to a ball-crank 87 loosely mounted on the main drive shaft 38. Pivotally mounted at the underside of the plate 25 is a roller 88 against which bar 86 is held by a spring 89 substantially parallel to said bar and attached at its rear to a short arm projecting from the pivoted end of the bar whereby the bar is urged forwardly by the spring. Bar 86 is formed with a rounded rearwardly-facing notch 90 adapted to engage pin 85. As will be brought out hereinafter the pin 85 in bell-crank 83 is controlled through link 80 so that the return movement is adjusted to equal the feed movement.

In entering in the accumulator wheels a number set up by the keys, operating arm 22 is depressed and swings an arm 91 secured to the shaft 30. A pin 92 carried by arm 91 engages an ear 93 on bell-crank 87 and through a pivotal connection between the downwardly extending arm of bell-crank 87 and the rear end of bar 86, draws the bar rearwardly against the action of spring 89 until the end snaps off the roller 88 and comes into engagement with pin 85. Then as the operating handle 22 returns to its normal position, it releases the stressed spring 89 to advance the bar and cause the notch 90 to pick up the pin 85, thereby urging the bell-crank 83 to turn in a clockwise direction as viewed from above and through link 82 to return the carriage to the right to its normal position where it will be retained by the escapement mechanism. However, the return of the carriage to normal position before the handle has returned substantially to its normal position, is prevented by suitable locking means including a locking comb 94 which engages the lower edge portion of the side frame 55 of the travelling carriage during the operating and return movements of the operating arm or handle 22. It should be noted that most of the parts of the carriage return mechanism are so formed and assembled as to take up little space vertically.

Figure 4:
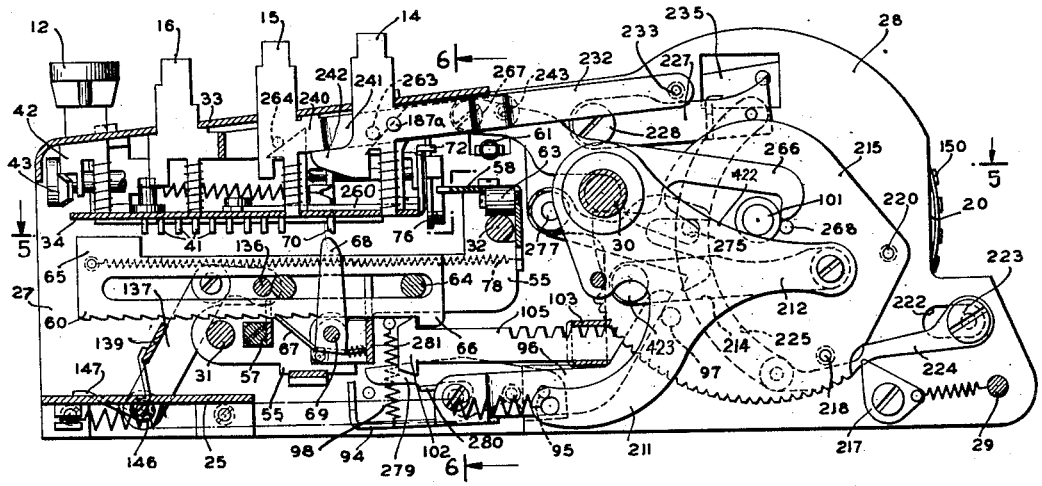
Fig. 4 is a cross-section through 4—4 of Fig. 2 taken just inside the right-hand side frame of the machine, showing the keys and the associated travelling stop carriage mechanism and the operation control cam.
Figure 5:
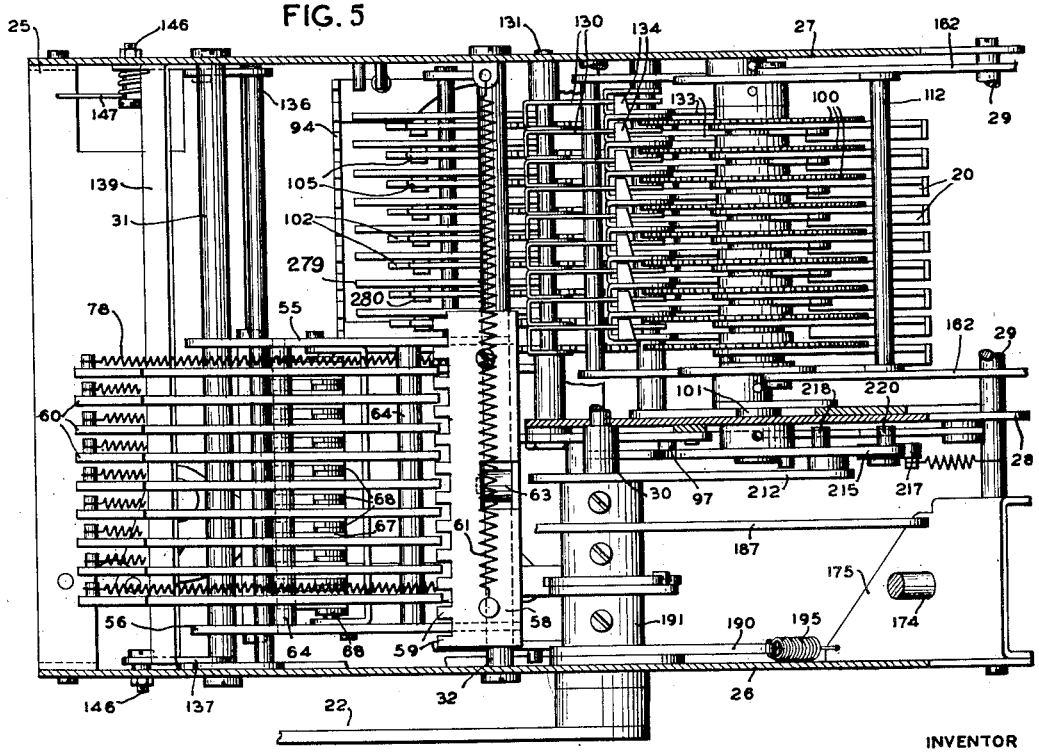
Fig. 5 is a plan section, taken on the line 5—5 of Fig. 4 showing the travelling stop carriage, accumulator racks, associated gears and accumulator wheels.

Depression of the operating lever or arm 22 effects counter-clockwise movement of the shaft 30 as viewed in Fig. 4, and causes locking of the travelling carriage. The locking means includes said locking comb 94 movable into and out of engagement with the lower edge of said frame 55 of the travelling stop carriage. This comb 94 is pivotally mounted by means of a cross bar 95 (Fig. 3) and is urged to locking position by a spring 98. At one of its ends the comb is provided with an arm 96 (Fig. 4) which extends upwardly into the path of a pin 97 (Fig. 5) on a cam disc 215 fixed on a transverse shaft 101 and serving as part of the control mechanism.

As shown in Fig. 4, a link 214 is pivotally connected at one end to disc 215 at the point 423, and at its other end is pivotally connected to the rearwardly extending arm 212 of a lever 422 secured to shaft 30. Another arm 211 of said lever 422 extends downwardly and forwardly and is urged toward the front of the machine by a spring 213 which urges the lever 422 and the shaft 30 to turn in clockwise direction to normal position with operating handle 22 substantially horizontal. Depression of operating handle 22 will turn in counter-clockwise direction shaft 30, lever 422 and disc 15 thus relieving arm 96 from pressure by pin 97 and permitting locking comb 94 to be moved by spring 98 into locking engagement with side frame 55 of the travelling carriage. It should be understood that hook 278, subsequently described, is effective on arm 96 only during total and sub-total taking. It will be evident that the carriage will be locked against movement except when the handle 22 is near or at its normal position.

Figure 8:
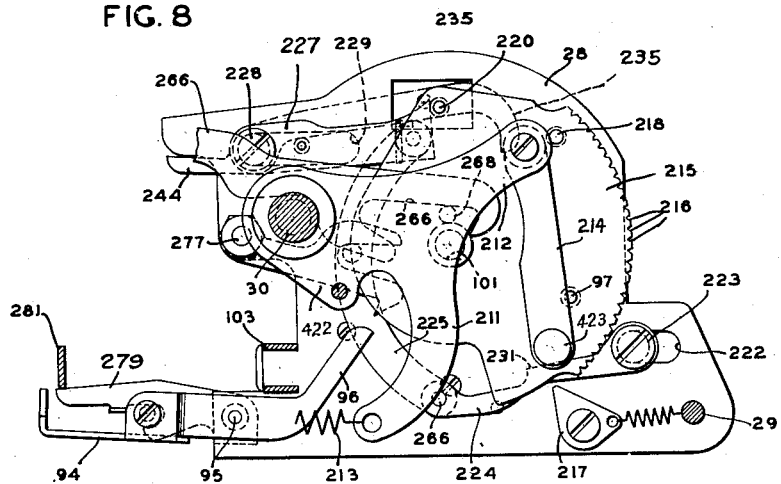
Fig. 8 is a detail view of the driving arm and its associated operation control cam.

The disc 25 may be used as part of a full stroke device and for this purpose is provided at its lower edge with a series of serrations or notches 216 arranged in an arc of a circle about the axis of shaft 101 and adapted to be engaged by a spring-actuated pawl 217 (Fig. 8).

*Accumulator-gear setting*

Accumulator gears 100 loosely mounted on shaft 101 are in mesh with generally horizontal racks 105 slidably mounted in slotted members 103 and 104, and said racks are arranged at the same denominational spacing as the slides 60 but are located at a lower level and at the left of the machine, so that the downwardly extending stop or shoulder 66 of each slide may be positioned behind an upwardly extending shoulder or stop of a T-shaped head 102 with which each rack 105 is provided. As the carriage is fed to the left one step with each digit-setting of a slide 60, the downwardly extending shoulder 66 of a slide for which a digit key is depressed is to the rear of the corresponding upwardly extending shoulder on the head 102 of the slide 105 aligned therewith, and is spaced to the rear a number of steps corresponding to the digit key depressed. When the operating handle 22 is depressed the accumulator gears will be operated yieldingly to bring the upwardly extending shoulders of racks 105 into engagement with the downwardly extending shoulders of the corresponding slides 60.

Such yielding means includes, adjacent to each accumulator gear, a type sector 20 also loosely mounted on shaft 101. A pin 107 on each accumulator gear 100 extending into a hole 106 in each type sector limits the relative movement of the two members and a connecting spring 110 provides a resilient connection. Each type sector is urged to turn in a counter-clockwise direction (Fig. 11) by means of a spring 108, but all of the type sectors are normally held in the positions shown in Figs. 3 and 11 by a restoring bail 112 carried by arms 111 fixed on shaft 101. Upon depression of operating handle 22 the ball will release the type sectors and the corresponding springs will act to turn the type sectors and accumulator gears in counter-clockwise direction thus drawing racks 105 corresponding to operated slides 60, rearwardly until stopped by engagement with shoulders 66 of the slides.

This action would tend to draw to the rear all racks 105 to the left of the carriage and of the slides and thus produce a false setting of the corresponding accumulator gears or wheels. However, such improper action may be avoided by locking means which will now be described. For this purpose use is made of the downwardly projecting stops or shoulders of the T-shaped heads of slides 105, in connection with locking pawls 279 pivoted on rod or shaft 95 and having at their lower edges forwardly-facing movement-limiting hooks loosely engaging a bail or rod 278a supported at its ends by comb 94, individual springs 282 urging upwardly the forward ends of the pawls which are provided with lugs 280 (Figs. 7 and 8) to engage the lower portions of the T-shaped heads 102. A cross bar 281 of the carriage limits the upward movement of the forward ends of all of these pawls 279 located under the carriage at any time, thereby preventing the locking in forward position, of any rack 105 under the carriage.

*Totalizer*

Totalizer gear wheels 115 and their individual dial or numeral wheels 17 (Fig. 11) are loosely mounted on a shaft 115a secured in plates or end members 113 and 114 (Fig. 2) of a frame which also includes cross rods 118 (Fig. 11) and 123. Said plates or end members 113 and 114 are mounted for oscillation on cross rod 118 (Figs. 2, 9 and 11) and plate 114 is provided with a cam slot 116 of which the edges are engaged alternately by a pin 117 adjustably secured to a slidable member or plate 230. For such adjustability, the pin 117 may be mounted eccentrically on a screw member secured in said plate.

Said plate 230 is at the left of said frame 28 and is mounted for substantially horizontal movement by means of stud shafts 223 and 228 projecting therefrom through slots 222 and 229 in said mid-frame, stud shaft 223 being at the rear end of plate 230 and stud shaft 228 being at the front end thereof. Movement of plate 230 toward the front of the machine causes pin 117 to engage edge 121 of the cam slot and swing the frame in a clockwise direction about rod 118 to bring the totalizer gears into engagement with the drive gears 100. Movement of plate 230 in the opposite direction, that is to the rear, causes pin 117 to engage the edge 119 of the slot 116 and cam the gears 115 out of engagement with drive gears 100.

Figure 10:
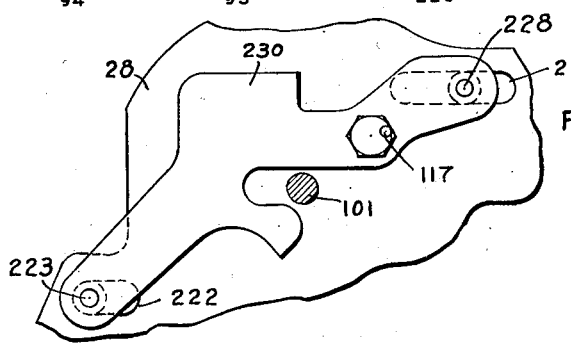
Fig. 10 is an enlarged side view of an accumulator shifting plate and its mounting on a mid-frame.
Figure 9:
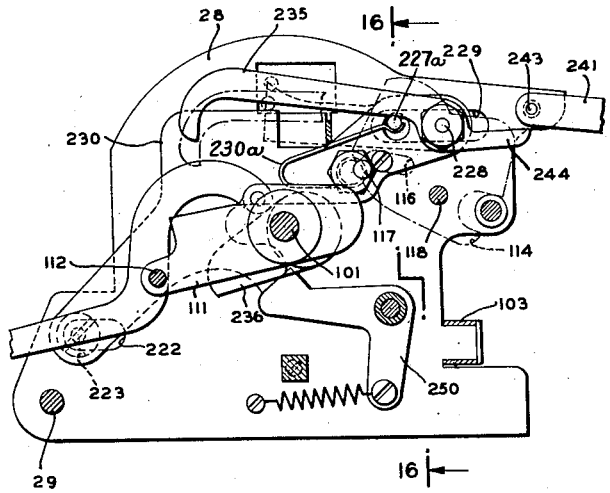
Fig. 9 is a detail of mechanism including the plate for shifting the accumulator wheels.

For moving plate 230, use may be made of a link 224, pivotally mounted at its rear end on stud shaft 223 and located at the opposite side of the mid-frame 28 from the plate 230. At its forward end the link 224 is pivoted to the lower end of a link 225 which in turn is pivoted at its upper end to a lever 227 mounted on said stud shaft 228 and having a flat rear end which is normally positioned in the path of a pin 220 mounted on disc 215. When the cam disc 215 is rotated counter-clockwise as a result of depression of operating handle 22, said pin 220 (Figs. 4 and 8) engages the lever 227 and moves toward the front of the machine the stud shaft 228, the links 224 and 225 and the plate 230 (Fig. 9). The plate 230 is engaged and held in this forward position by a spring-pressed detent 250 (Figs. 9 and 10) on the frame 28, thus yieldably holding the totalizer wheels in mesh with the accumulator or drive gears 100. Upon movement of plate 230 to the rear detent 250 will yield and then return to a position to hold the totalizer wheels out of mesh with the wheels 100.

The intermeshing condition is reached near the end of the operating stroke, that is near the end of the first half cycle. During the return stroke of handle 22, the cam disc 215, the operated drive gears 100 and the operated type sectors return to normal, the cam disc 215 rotating clockwise until pins 218 and 220 are in the position of Fig. 6. It should be noted that during the operating stroke of the handle 22 all of the racks 105 except those corresponding to selected slides 60 are locked in their forward positions against rearward movement and hold the corresponding gears 100 against rotation. However, racks 105 corresponding to selected slides are drawn to the rear distances corresponding to the selected depth by the gears 100 and when, after the totalizer gears are brought into mesh with the accumulator gears, the return stroke of the handle occurs, the accumulator wheels corresponding to the rearwardly shifted racks 105 will turn sufficiently to move the selected racks back to their normal positions and will at the same time turn the totalizer gears 115 to extents corresponding to the selected digits.

At the beginning of the next cycle, the pin 218 engages a shoulder 231 on link 224, thereby shifting the plate 230 rearwardly and camming the totalizer gear wheels out of mesh with the accumulator or drive gears.

Carry over mechanism

Carryover from any totalizer gear 115 to the next higher gear, may be effected by any suitable means, but the means about to be described was designed especially for the machine embodying the present invention.

Figure 11:
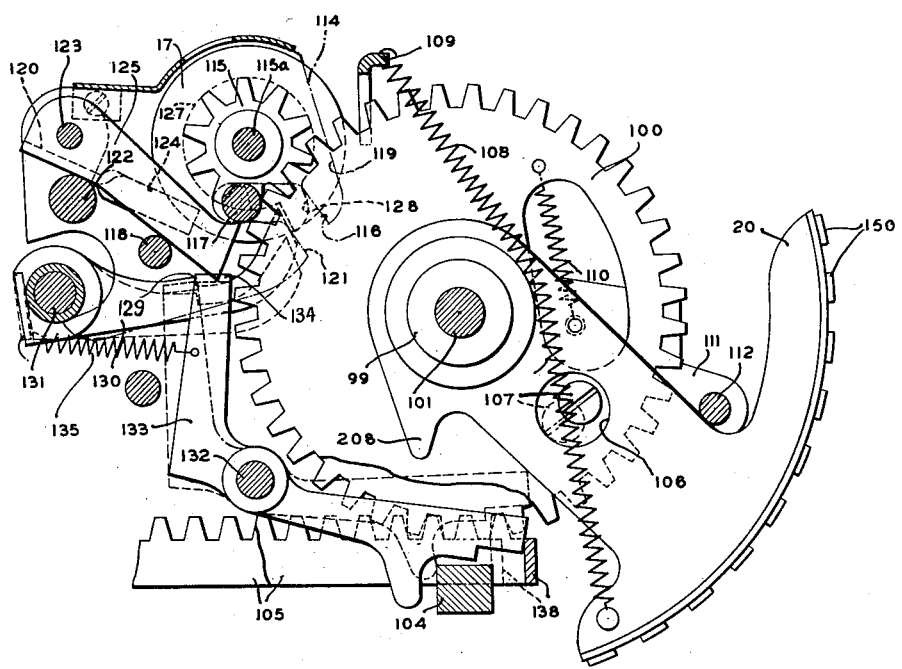
Fig. 11 is a detail view of an accumulator gear, rack, totalizer gear, dial wheel and type sector.

Secured to each totalizer gear 115 in any suitable manner is a disc 127 which is provided with a carry lug and zero stop 128 (Fig. 11). Extending into the path of the lug 128 is a carry arm 130 loosely pivoted on a cross shaft 131 carried by the side frame 27 and mid frame 28. Loosely mounted on a cross shaft 132 is a series of L-shaped arms 133 each having a right angle lug 134 at the top thereof and overlying the carryover of the next higher order. In normal position the lug 134 rests against the shoulder 129 on arm 130. Both associated arms 130 and 133 (Fig. 11) have U-shaped bases to provide steadier mounting on their respective shafts and are connected by a spring 135. If a digit is run into a totalizer gear and there has already been entered a digit such that the sum is more than nine, the carry lug 128 will cam the arm 130 down, releasing the lug 134 from the shoulder 129 and permitting the spring 135 to rotate the L-shaped arm or bellcrank 133 out of the path of the lug 138 on the rack of the next higher order. Thus the rack when returned goes forward a distance corresponding to one tooth on a drive gear and a "one" will be added or run into the accumulator gears.

The totalizer gears 115, while out of engagement with the drive gears, are held from rotation by stops at the ends of teeth 124 of a comb 120 and extending at right angles thereto. A coil spring 126 (Fig. 2) connected to the frame 113 and the comb 120 urges the comb counter-clockwise to engage gears 115 and hold them from rotation.

Slide restoring means

The restoration of the denominational slides 60 to their normal forward positions will now be described. A bail 136 (Figs. 4 and 12) for restoring the selecting slides 60 to their normal forward positions, extends through the guide slots of said slides and just to the left (Fig. 4) of the forward guide rod 64. At its ends the bail 136 is connected to short links which at their forward ends are pivotally connected to the upper ends of arms 137 which are pivoted at their lower ends on stud shafts 146 and are connected by a transverse member 139 preferably integral therewith and serving to make them move together. A coil spring 147 having one end bearing against the cross member 25 and the other against said cross or transverse member 139, urges said arms to swing in a clockwise direction (Fig. 3) to limiting positions against the tie rod 31.

Pivotally connected to the right hand arm 137 is a link 170 (Fig. 12) provided at the lower side of its rear end with a shoulder 171 adapted to cooperate with a pin 172 on a lever 190 loosely pivoted on a sleeve 191 secured to shaft 30. Secured to the sleeve 191 is an arm 192 having a lost motion connection with lever 190 comprising a pin 193 carried by arm 192 and extending into a hole in lever 190 large enough to permit lost motion. A bell crank 357 (Fig. 12) pivoted at 353 carries a pin 359 which engages a forwardly extending arm 368 integral with arms 192, and is provided with a lug 362 engaging the lower edge of link 170.

Depression of arm or handle 22, rotates shaft 30 in a clockwise direction (Fig. 12) and arm 368 swings downwardly and allows the rearwardly extending arm of the bell crank 357 to move downwardly into engagement with comb 103 and also the lug 362 to move downwardly and permit the link 170 to rest on the pin 172. The pin 193 takes up the lost motion in the hole 194 and rotates the lever 190 and pin 172 in a clockwise direction until the pin is behind shoulder 171 on link 170. This action stretches spring 195 connected to the rearwardly extending arm of lever 190 and also to the cross member or bar 175 at the lower part of the machine, and stores up energy for use in operating the slide-restoring bail 136 during the return stroke of arm 22, and tends to rock the restoring bail in clockwise direction (Fig. 12) and to restore operated stop slides 60 to their normal positions.

The power to move the bail 136 to restore the slides 60 is thus derived from spring 195 which is put under tension as the handle 22 makes its forward stroke. During the return stroke of handle 22 the spring is released under control of the handle and due to the lost motion connection, restoration should be completed before the handle reaches its normal position. Of course the spring 195 is stronger than the spring 147 and finally restores the operated slides 60 to their normal position. During the restoring action the pin 172 (Fig. 12) is in engagement with the notch 171 of link 170 but upon movement of the bail to its extreme forward position the link 170 is disengaged from pin 172 by means of lug 362. It should also be understood that in order for the operated slides to be restored to normal position the corresponding racks 105 must be restored to normal positions in connection with the running of the selected number into the totalizer.

*Printing mechanism*

Although any suitable printing mechanism may be used in cooperation with the type sectors 20, certain features of the printing mechanism designed particularly for this machine are disclosed.

The type digits 150 are arranged along the type sectors with the zeros at the top, and their planes of movement are in alignment with the accumulator gears 100. The type sectors 20 constitute part of the mechanism for setting the accumulator gears 100 and from the time when a type sector 20 is raised to place its zero digit at the printing line, the sector and the corresponding accumulator gear retain such a connection that they assume the corresponding settings at all times until the type sector is returned to its normal position.

While the type sectors are in position for entering the amount set up by use of the keyboard, the platen 18 is moved to bring paper passing thereover from the roll 19, into engagement with type 150 on the type sectors through an ink ribbon. The platen 18 is carried by a shaft 149 which can be turned by a knob or finger wheel 167 at one end or by means including a ratchet 160 at its other end. For this movement the shaft 149 is rotatably mounted in arms 151 and 152 (Fig. 1) which in turn may be mounted on cross shaft 29. These arms 151 and 152 are connected to the rear ends of links 162 pivoted at their forward ends to arms 111 carrying bail 112 which cooperates with the type sectors. By means of said links 162 the platen 18 is swung to printing position as the handle 22 approaches the end of its downward movement.

A spindle 174 is secured to a base plate 175 carried on the cross shaft 29 (Fig. 20) and on this spindle is slidably mounted a sleeve on which are positioned two ribbon spools connected to opposite ends of the ribbon. Each of the spools comprises a hub and circular plates or discs 178 and 179 which are provided at their edges with ratchet teeth. Mounted for oscillation on the sleeve is a bell crank 180 (Figs. 12 and 13) to which is pivotally secured an arm 181 (Fig. 13) having at opposite ends thereof star wheels 182 and 183 secured to the ends of a common shaft pivoted in said arm 181. The spools and the bell crank 180 are located between the arms of a frame 185 carried by the sleeve on the spindle 174, and are held in frictional engagement by a spring 188. A lever 187 pivotally mounted on shaft 30 and actuated by pin 187a on the total key 14 raises or lowers the ribbon when the total or sub-total mechanism is actuated.

The star wheels 182 and 183 are fixed to their common shaft with their teeth in staggered relation whereby one wheel can be yieldingly held in a position to be operative on the corresponding disc of discs 178 and 179 and the other will be held in inoperative position with respect to the other, by a spring 197 fixed to arm 181. One star wheel actuates the associated toothed disk and spool until the end of the ribbon is reached, whereupon the engaging star wheel will be rotated against the resistance due to the spring 197 and the other star wheel will come into action thus reversing the ribbon feed.

*Zero non-print mechanism*

With the mechanism disclosed in the foregoing, operating movement of the handle 22 will advance type sectors of all denominations in which no digits have been indexed, to positions to print zeros not only in the number itself but also to the left of the highest significant digit, which is undesirable.

If any significant digit has been indexed to control a certain rack 105, that rack will start rearwardly as soon as lever 22 is operated. The rearward movement of the rack will cam down the corresponding lever 200 and as the bail 112 is rotated in a counter-clockwise direction the corresponding type-sector 20 will follow. As the corresponding lever 200 swings downwardly about shafts 201 (Fig. 3), a pin 203 on the lever 200 engages the hook member 204 on a lever (Fig. 3) and draws it downwardly to rotate the lever clockwise about the pivot at its top and carries a shoulder thereon out of the path of lug 208 on the type sector whereby the type sector rotates under control of a corresponding accumulator gear 100. When a zero is to be entered to the right of the one just described, the lever 200 will engage arm 209 of lever 200 and cause it to be lowered, thus drawing shoulder 207 out of the path of lug 208 and permitting a zero to be printed.

For denominations of higher order, the indexing of a zero would cause locking of the corresponding type sector in non-printing position, due to engagement of lug 208 on the type sector with the shoulder on the rear edge of hook number 204.

*Repeat key control*

If one item is to be listed more than once, the repeat key 16 is depressed and a lug 350 thereon engages an upturned lug 351 of an upright slide 352 (Figs. 2 and 12) slidably mounted on studs 353 on frame 27, and depresses the slide against the resistance of spring 354. In this downward movement of slide 352 brings a lug 355 thereon into engagement with a forwardly extending arm 356 of the bell crank 357 pivoted upon the stud 353, and also carries a cam-faced lug 363 into engagement with bar 86. The lug 356 rocks bellcrank 357 in a clockwise direction and the lug 362 on bell-crank 357 raises the link 170 to a position where it will remain until the repeat key is released.

The downward stroke of the lever 22 will swing the pin 172 rearwardly but on the return stroke the pin 172 will not engage the shoulder on the link 170 and will not restore the stops or slides 60. Also, upon operation of the repeat key, the lug 363 will cam the bar 86 out of the path of pin 85 (Fig. 13), thereby disabling the carriage return mechanism.

Taking of totals and sub-totals

For these operations the totalizer gears are in mesh with the accumulator gears during the first half of the operation cycle and out of mesh during the second half cycle.

Figure 7:
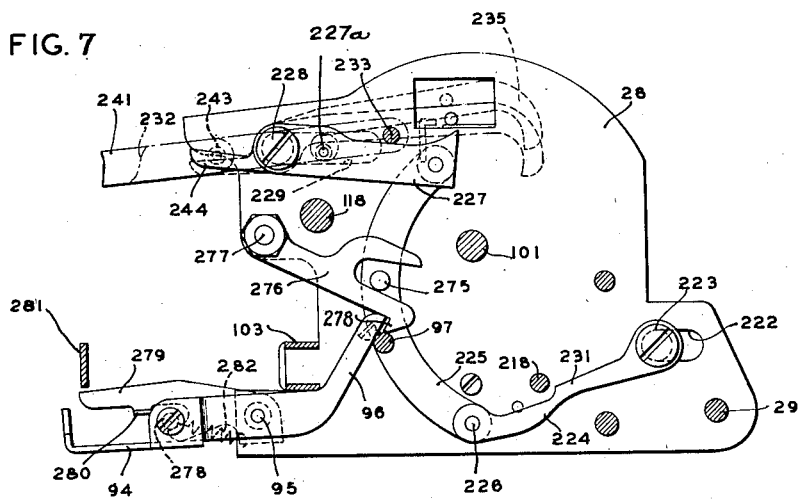
Fig. 7 is a detail of the accumulator operating arm and its associated mechanism.

Depression of the total key 14 causes an arm 232 (Figs. 2 and 4) thereon to move a pin 233 cooperating with a lever 227. Depression of key 14 to take a total causes the lowering of lever 227 and consequent lowering of link 225 and lever 224 (Fig. 7). The lever 227 is normally held in its raised position by means of a spring 230a at the opposite side of frame or plate 28 in engagement with a pin 227a projecting from lever 227 through a suitable opening in the plate 28.

Secured to the link 225 is a pin 275 (Fig. 7) adapted to engage a slotted portion of an arm 276 pivoted to the frame 28 at 277 and provided with a hook portion 278 provided to engage the upper end of the arm 96 during the total-taking operation. The lowering of the link 225 by depression of the total key lowers said pin 275 and consequently arm 276 so that hook portion 278 engages arm 98 and locks pawls 279 against movement to effective position, thus leaving racks 105 free for rearward movement.

Pivotally mounted on the same shaft 228 as lever 227 and on the opposite side of the frame or plate 28 is a hook-shaped lever or link 235 which rests on pin 227a. Depression of the total key 14 causes depression of lever 227 and pin 227a, and permits hooked arm 235 to drop to the dotted line position in Fig. 15 with its hooked end in position to be engaged by arm 236 fixed on shafts 101.

In a total-taking cycle of operation by the handle 22, the totalizer gears 115 are in mesh with the accumulator gears 100 during the first half cycle. In the ordinary item-entering operations, the totalizer gears remain in mesh with the accumulator or drive gears and are not thrown out of mesh until the beginning of the next cycle of operation under control of the handle 22 when pin 218 on disc 215 engages shoulder 231 on link 224 and shifts plate 230 to the rear, the lever 227 being in raised position and holding link 224 in its raised position with shoulder 231 in the path of pin 218. After depression of lever 227 by means of the total key 14, shoulder 231 will be out of the path of pin 218 and the totalizer gears will remain in mesh with the accumlator gears during the first half cycle.

Thus as the handle 22 is given its operating stroke, the totalizer gears and wheels will rotate until zero stops 128 reach the carry arm 130 and the type sectors are held in position to print a total, the totalizer dials being turned to cleared or zero positions. As the shaft 101 continues to turn in a clockwise direction (Fig. 9), the end of arm 236 gets behind the hook lever 235, and at the beginning of the last half cycle moves in a counter-clockwise direction to engage the hook lever and draw the shaft 228 and plate 230 to the rear of the machine, thus shifting the totalizer gears out of mesh with the accumulator gears. The plate 230 is then held in its rearward position by detent 250.

In taking a sub-total the totalizer gears remain in mesh with the drive gears throughout a complete cycle of operation by the handle 22, whereby after setting the type sectors to print the sub-total, the sub-total is returned into the totalizer. To obtain the sub-total, the sub-total key 15 is depressed. This key has a rearwardly extending arm provided with a shoulder 240 to engage a heel 242 on total key 14 and depress key 14.

A slidable latch 260 (Fig. 2) on plate 34 serves to lock the total and sub-total keys in depressed positions by means of hooks 261 and 262 projecting upwardly from the latch to engage pins 263 and 264, respectively. The latch 260 is urged forwardly by spring 265 which yields upon depression of either key to locking position.

The taking of a sub-total differs from the taking of a total, in that the totalizer gears are kept in mesh with the accumulator or drive gears during the second half of the cycle of operation by handle 22, and in this machine the desired result is obtained by maintaining hook member 235 in raised position out of the path of arm 236 during the second half cycle. This effect is produced by providing the arm 241 extending rearwardly from sub-total key 15 with a pin 243 overlying a tail 244 on hook member 235 to the rear of stub shaft 228, whereby depression of key 15 raises hook member 235 out of the path of arm 236, thereby preventing disconnection of the totalizer gears during the second half of the cycle.

Resetting of total and sub-total keys

Referring to Fig. 4, the total key 14 and the sub-total key are released from latch 260 by means including a link 266, of which the forward end is pivoted at 267 to the latch 260 and the rearward end is in the form of a hook positioned above a pin 268 on the disc 215. The counterclockwise rotation of disc 215 will cause pin 268 to pass beneath the hook portion of the link, and a following clockwise rotation of disc 215 will cause pin 268 to engage the hook of link 266 and draw the link rearwardly, thus releasing the pins 263 and 264 and permitting restoration of keys 14 and 15 to their normal positions, and upward swing of arm 276.

Operation

Starting with the stop carriage in its right hand position successive depression of digit keys 11 corresponding to digits of a number will set the corresponding slides 60 distances to the rear corresponding to the values of the digits and, following each setting of a slide, the carriage will be fed one step to the left to place the last selected slide in alignment with the right-hand rack 105 in mesh with an accumulator wheel 100, and a downwardly extending shoulder on the rear end of the slide behind an upwardly extending shoulder on the front end of the rack.

The carriage in its movement to the left acts through a link 82 to set a pin 85 so that the return movement will be just the same as the leftward movement of the carriage.

After the number to be run into the totalizer has been indexed by means of the slides 60, the handle 22 is depressed. Substantially upon starting this movement the totalizer gears 115 are withdrawn from engagement with the accumulator wheels 100. At substantially the same time, the pin 97 on the cam disc 215 is moved downwardly to release arm 98 and permit comb 94 to rise and engage frame member 55 of the carriage and hold the carriage against accidental movement. Also release of arm 98 tends to cause pawls 279 to swing upwardly and by means of lugs 280 to lock racks 105 against rearward movement. However, cross bar 281 of the carriage limits the upward movement of pawls 279 thereunder and thus prevents the locking of any racks positioned under the carriage, that is racks aligned with selected slides.

During the remainder of the operating movement of the handle 22, spring devices are stressed and substantially at the end of this movement are connected to the carriage return mechanism and the slide-restoring mechanism. However, the carriage return mechanism cannot operate until the comb 95 releases the carriage substantially at the end of the return stroke of the handle 22 and all other parts have been restored.

Substantially at the end of the operating stroke the totalizer gears 115 are moved into mesh with the accumulator gears 100, and during the return movement of the handle 22, the gears 100 corresponding in denomination to the selected slides 60 are turned through a corresponding number of steps to return the racks to normal settings and drive the totalizer gears through a corresponding number of steps.

The operated slides 60 are released by restoration to normal position of the racks 105 but are not restored themselves until picked up by the bail 136 which is still under control by the handle 22. After all other parts have been placed in condition for indexing of another number and the handle 22 is substantially at the end of its return stroke, the comb 94 is lowered and the carriage-return means operates.

The foregoing description of operation is directed to mechanism embodying the more important parts of the invention herein involved but other parts are so closely related thereto as to render desirable the following description of operation.

The printing is effected simultaneously at the end of the forward stroke of the handle.

Depression of the total key 14 preparatory to taking a total depresses arm 232 and pin 233 thereon, said pin acting to depress lever or arm 227. Such downward movement of arm 227 lowers link 225 and pin 275 thereon so that hook member 278 engages arm 98 and prevents locking of racks 105 in forward position and lowers link or lever 224 so as to move shoulder 231 out of the path of pin 218 thereby preventing withdrawal of totalizer gears 115 from accumulator gears 100. Then a forward stroke of the handle 22 will turn the totalizer dials back to zero and set the type sectors 20 in position to print the total upon advance of the platen at the end of the forward stroke. Such downward movement of lever 227 allows hook 235 (Fig. 9) to move downwardly into the path of arm 236 on shaft 101. Near the end of the first half cycle the arm 236 moves under the end of the hook lever 235 and at the beginning of the second half cycle moves in the opposite direction and engages the hook end of lever 235 and acting therethrough on stud shaft 228 shifts plate 230 rearwardly and disconnects the totalizer gears from the accumulators, leaving the totalizer gears set at zero. Also the depressed total key will be released by means including hooked link 266 (Fig. 4) and the hooked arm or lever 276 will be raised and release arm 96 controlling latches 279.

In taking a sub-total, the operation differs from total taking only in that the totalizer gears are kept in mesh with the accumulator gears during the return movement of the handle 22 and the sub-total is run back into the totalizer. This change is produced by lifting hooked lever 235 so as to be out of the path of arm 236, by depression of tail 244 of hooked lever 235 by an overlying pin 243 carried by arm 241 extending rearwardly from sub-total key 15.

It should be understood that various changes may be made and that various features may be used without others, without departing from the true scope and spirit of the invention.

I claim:

1. In a calculating machine, a differential mechanism, a stop carriage for controlling the operation of said differential mechanism, escapement mechanism for said carriage, a locking comb to cooperate with said carriage in its different lateral positions for locking said carriage against lateral movement, said comb being mounted to move into and out of locking position, spring means urging said comb to locking position, a member fixed to said comb for retracting said comb against said spring means, a pin normally engaging said member to hold the comb in retracted position, and an operating handle for operating said differential mechanism during a forward and return stroke and moving said pin to release said member at the beginning of the forward stroke and to return the pin at the end of the return stroke to withdraw the comb.

2. In a calculating machine a series of digit keys, a differential mechanism whose position is controlled by said keys, a stop carriage, escapement mechanism for moving said carriage step by step under operation of said keys in setting up a number, an operating handle having a forward stroke and a return stroke for moving said differential mechanism to an extent determined by the stops in said carriage, a spring for returning said carriage to normal position, means operatively related to said handle to put said spring under tension during the forward stroke of said handle, means for holding said spring under tension during the forward stroke of said handle and during a large portion of the reutrn stroke thereof, and means for releasing said holding means as the handle completes its return stroke.

3. In a calculating machine, a series of digit keys, a differential mechanism whose position is controlled by said keys, a stop carriage, escapement mechanism for moving said carriage step by step under operation of said keys in setting up a number, an operating handle having a forward stroke and a return stroke for moving said differential mechanism to an extent determined by the stops in said carriage, a spring for returning said carriage to normal position, means operatively related to said handle to put said spring under tension during the forward stroke of said handle, means for locking said carriage against lateral movement in either direction during movement of said differential mechanism by said handle and means for releasing said lock as the handle completes its return stroke to permit said spring to return said carriage to normal position.

4. In a calculating machine, a series of digit keys, a differential mechanism whose position is controlled by said keys, a stop carriage, escapement mechanism for moving said carriage step by step under operation of said keys in setting up a number, an operating handle having a forward stroke and a return stroke for moving said differential mechanism to an extent determined by the stops in said carriage, a spring for returning said carriage to normal position, means operatively related to said handle to put said spring under tension during the forward stroke of said handle, a comb for locking said carriage against lateral movement in either direction during movement of said differential mechanism by said handle, said comb preventing said carriage return spring from acting while said comb is operative and means controlled from the handle for moving the comb to inoperative position as the handle completes its return stroke to thereby release the carriage and permit the return spring to return the carriage to normal position.

5. In a calculating machine, a series of digit keys, differential mechanism including a series of racks whose position is determined by said keys, a stop carriage having a series of slides therein settable selectively by said keys, means for moving said carriage step by step under operation of said keys to align said stop slides with said racks, a latch for each rack for holding any rack against movement, a spring for each latch to move a latch to rack holding position, a locking comb cooperating with said carriage for locking it against lateral movement, a bail rod movable with said comb for controlling said rack latches, and means on said carriage for selectively controlling the movement of said latches in accordance with the movement of the carriage.

6. In a computing machine, a series of digit keys, a carriage movable step by step under control of said keys, a series of stop slides in said carriage each differentially positionable under control of said keys, an operating shaft having a forward stroke and a return stroke, a bail having a normal position permitting said slides to be differentially positioned and movable to reset said slides, a spring for moving said bail to normal position, a stronger spring for moving said bail to slide restoring position, means to store power in said stronger spring during the forward stroke of said shaft, and means for rendering such stored power effective to move said bail to restoring position and then render said strong spring ineffective on said bail to permit restoration to normal position by the first mentioned spring.

7. In a computing machine, a series of digit keys, a carriage movable step by step under control of said keys, a series of stop slides in said carriage each differentially positionable under control of said keys, an opertaing shaft having a forward stroke and a return stroke, a bail having a normal position permitting said slides to be differentially positioned and movable to reset said slides, a spring for moving said bail to normal position, a stronger spring for moving said bail to slide restoring position and means to store power in said stronger spring during the forward stroke of said shaft, and means for permitting said stronger spring to restore said slides as the handle nears the end of its return stroke and subsequently permitting said weaker spring to restore the bail to normal position.

8. In a calculating machine, a series of digit keys, differential mechanism including a series of denominational racks, a stop carriage supporting differentially settable denominational stops, escapement mechanism for moving said carriage step by step under operation of said keys in setting up a number and aligning the stops with the racks, an operating handle having a forward and a return stroke for moving said racks in accordance with the stops set in said carriage, a latch for each rack for holding it against movement yieldably urged to its effective position, a rocking frame comprising an element normally retaining all of said latches in their ineffective position, means yieldably urging said rocking frame in a direction to render said latches effective on said racks, means on said carriage for preventing locking action by latches aligned with denominational stops on said carriage, a controlling arm on said frame, a member normally engaging said arm to hold said frame and said latches in ineffective position, and means operated by said operating handle at the beginning of its forward stroke to withdraw the arm-engaging member and permit rocking of said frame and advance of the latches to latching position and to return said arm-engaging member, said rocking frame and said latches to their normal position at the end of its return stroke.

9. In a machine according to claim 8, wherein a total control key is provided, and wherein latching means operated by said key is provided to prevent movement of said arm in a totaling cycle when the same is released by said engaging member.

LOUIS M. LLORENS.